9856X
J. S. Williams,
Stone Pavement,
Patented July 1, 1836.
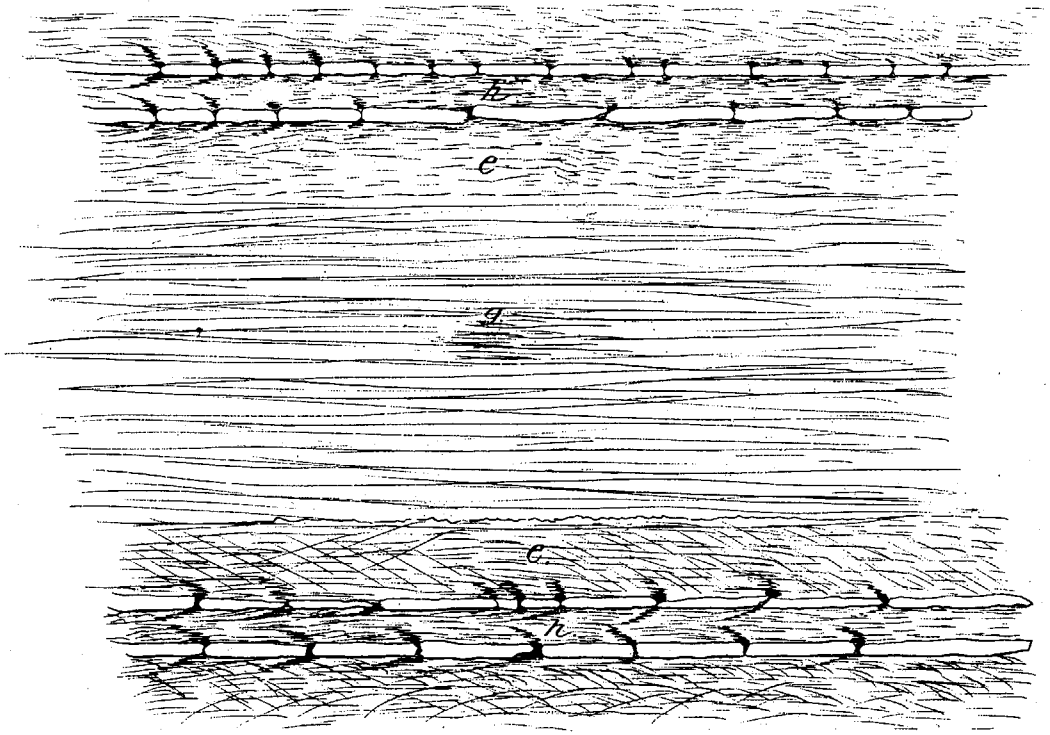
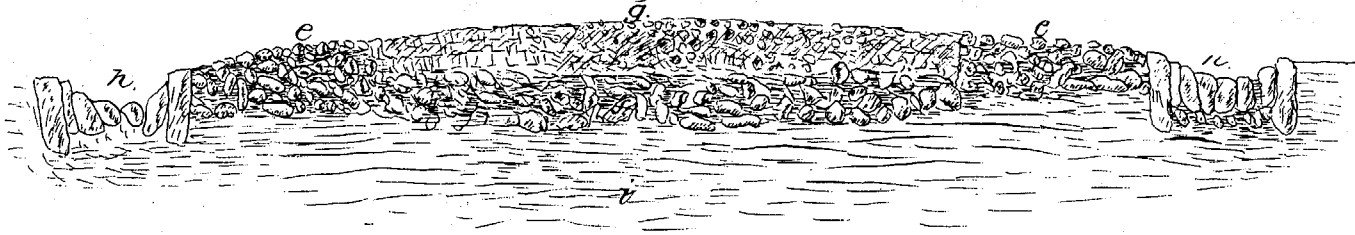
N. PETERS, PHOTO-LITHOGRAPHER, WASHINGTON, D. C.

7/1/1836 9856X

July 1. 1836

Jno. S. Williams of Fulton Township Ohio

Letters Patent

The Schedule referred to in these Letters Patent and making part
of the same containing a description in the words of the said Jno.
S. Williams himself of his improvement in the art of Road making"

To all to whom these presents shall come. Be it known,
that I Jno. S. Williams of Fulton Township in Hamilton Coun
ty and State of Ohio, have invented a new and useful improve
ment in the art of Road making and that the following is
a full and exact description thereof. I prepare stone in
the usual manner for the construction of a McAdamised cover
by reducing it to particles not exceeding a specified maximum
weight or size. I then prepare the bed of the Road in the usual
manner by laying on the stone cover. But instead of making the
McAdamised cover of the usual width it is to be laid narrower
to which an edging of rough stone or gravel is to be added to each side
to make out the intended width of cover. It is not intended to
confine the Road maker to any specific mode of combining the
smooth cover with the rough edging but the method I prefer is this
After the bed is prepared to receive the prepared stone, let a layer
of it be laid, but before it is rolled or travelled let a rough edging
be laid on each side thick enough to receive the full McAdamized
cover after it is consolidated. For a McAdamized cover laid
a foot in depth, 8 or 9 inches of edging will be sufficient thickness
which may be thinner at the extreme edges. If this edging is to be
of common pavement laid solid, no farther labor on it will be
necessary. but if the edging is to be of rubble stone it will be neces
sary to pound it with sledges or long handled hammers until the top
stones are reduced to a convenient size say not exceeding three inch
es in greatest dimentions. If the edging be of gravel it will be
necessary to lay it in layers not exceeding the thickness of the
layers of stone for the centre cover and to roll both centre and

298.

edging simultaneously. The Telford Road is constructed by setting
a thin but very rough pavement of large stone in the bottom.
over which a layer of stone prepared in all respects as for a Mc
Adamized cover is to be spread and travelled down, into a smooth
surface. It is intended to combine this kind of Road with
rough edging in like manner and for similar purposes. In this
case I should prefer to construct the rough edging first, and the space
between for the reception of the prepared stone.
I do not claim as my invention the construction of either Mc Adam
ized or Telford Roads neither do I claim the paving of street
gutters, where the centre is Mc Adamized, But what I do claim
as my own invention and not previously known in the art of
Road making is the combining or using a rough edging of any kind
with a Mc Adamized or Telford cover, the intention of constructing
the rough edging being principally to make width to accommodate
passing vehicles and to give support to the edges of the smooth
cover to prevent the small particles of which they are composed
from spreading out into thin and weak edges.

Witnesses
John A Wiseman
Jesse Oneille

Jno. S Williams (600 words)

(Patented July 1, 1836)

Drawing made.